(12) United States Patent
Schweizer et al.

(10) Patent No.: US 12,081,142 B2
(45) Date of Patent: Sep. 3, 2024

(54) MODULATOR FOR FLYING-CAPACITOR TYPE MULTILEVEL CONVERTER, MULTILEVEL CONVERTER, AND METHOD FOR OPERATING MULTILEVEL CONVERTER

(71) Applicant: ABB Schweiz AG, Baden (CH)

(72) Inventors: Mario Schweizer, Rütihof (CH); Daniel Christen, Uster (CH); Hemant Bishnoi, Aargau (CH)

(73) Assignee: ABB Schweiz AG, Baden (CH)

( * ) Notice: Subject to any disclaimer, the term of this patent is extended or adjusted under 35 U.S.C. 154(b) by 203 days.

(21) Appl. No.: 17/889,113

(22) Filed: Aug. 16, 2022

(65) Prior Publication Data

US 2023/0060063 A1 Feb. 23, 2023

(30) Foreign Application Priority Data

Aug. 17, 2021 (EP) ..................... 21191751

(51) Int. Cl.
*H02M 7/483* (2007.01)
*H02M 1/00* (2006.01)

(52) U.S. Cl.
CPC ....... *H02M 7/4837* (2021.05); *H02M 1/0058* (2021.05)

(58) Field of Classification Search
CPC .. H02M 7/483; H02M 7/4837; H02M 1/0058; H02M 1/0054
See application file for complete search history.

(56) References Cited

U.S. PATENT DOCUMENTS

2022/0190712 A1* 6/2022 Chen ................... H02M 1/4225
2023/0336070 A1* 10/2023 Wijekoon ........... H02M 1/0054

OTHER PUBLICATIONS

Blackwell et al., "Dynamic Level Selection for Full Range ZVS in Flying Capacitor Multi-Level Converters," *2018 IEEE 19th Workshop on Control and Modeling for Power Electronics (COMPEL)*, 8 pp. (Jun. 25-28, 2018).
Rentmeister et al., "Zero Voltage Switching for Flying Capacitor Multilevel Converters at Nominal Conversion Ratios," *2019 IEEE Applied Power Electronics Conference and Exposition (APEC)*, 30-36 (Mar. 17-21, 2019).
European Patent Office, Extended European Search Report in European Patent Application No. 21191751.3, 7 pp. (Feb. 2, 2022).

* cited by examiner

*Primary Examiner* — Adolf D Berhane
(74) *Attorney, Agent, or Firm* — Leydig, Voit & Mayer, Ltd.

(57) ABSTRACT

A modulator for a flying-capacitor type multilevel converter receives, at an input, a time-variant reference signal and provides, at an output, a sequence of target levels, to provide switching signals for switching between discrete output levels of the multilevel converter according to the shape of the reference signal. The modulator determines a critical level as an intermediate output level of the multilevel converter which is closest to the level of the reference signal; and outputs only target levels corresponding to output levels different from the critical level.

11 Claims, 7 Drawing Sheets

MODULATOR FOR FLYING-CAPACITOR TYPE MULTILEVEL CONVERTER, MULTILEVEL CONVERTER, AND METHOD FOR OPERATING MULTILEVEL CONVERTER

CROSS-REFERENCE TO RELATED APPLICATIONS

This patent application claims priority to European Patent Application No. 21191751.3, filed on Aug. 17, 2021, which is incorporated herein in its entirety by reference.

FIELD OF THE DISCLOSURE

The present disclosure generally relates to a modulator for a multilevel converter of the flying-capacitor type. It further relates to a flying-capacitor type multilevel converter comprising the modulator, and to a method of operating a flying-capacitor type multilevel converter.

BACKGROUND OF THE INVENTION

Power converters that convert an input voltage into an AC power output signal are generally known in the art. A typical power converter comprises a switching cell constructed of a series of, for example, MOSFET or IGBT switches. During operation, in a switching cell, either both switches are in the OFF state, i.e. the non-conducting state, or exactly one of the switches is in the ON state, i.e. the conducting state.

A multilevel converter is one type of a power converter. In a multilevel converter, switching cells are combined e.g. in a cascaded manner such that at the output of the multilevel converter, three or more possible voltage levels can be output, and a fast switching between these output levels is performed in order to approximate a desired output shape of the AC power output signal. One type of a multilevel converter includes so-called "flying capacitors" or "floating capacitors". Each flying capacitor floats with respect to the ground potential. A flying-capacitor type multilevel converter may be abbreviated as FC-MLC hereinbelow.

A non-limiting example of a flying-capacitor type multilevel converter is a five-level FC-MLC. When VDC designates the input voltage, the five-level FC-MLC utilizes the voltage levels of −VDC/2, −VDC/4, 0, +VDC/4, and +VDC/2. In this exemplary case of five levels, three flying capacitors are used. In the switching of the FC-MLC, redundant switching states may be employed, in which the capacitors may be charged or discharged while the voltage at the output node of the FC-MLC remains the same. In this way, a balancing (voltage balancing) of the cell topology can be performed. A state selector selects among the redundant switching states according to the target level received at its input. The target level, in turn, is provided by a modulator that generates a sequence of target levels according to a time-variant reference signal. The goal is to provide a signal shape at the output of the FC-MLC that adequately approximates the shape defined by the time-variant reference signal.

In the conventional technology, the switches in the switching cells of a FC-MLC are operated, i.e. switched into the ON state or the OFF state, at the time instants that are defined by the time-variant reference signal. This so-called hard switching typically leads to high switching losses since the switching instant is most often not optimal with respect to the switching losses. There is a desire for lowering these switching losses.

BRIEF SUMMARY OF THE INVENTION

According to an aspect, a modulator for a flying-capacitor type multilevel converter, FC-MLC, is provided. The modulator is configured to receive, at an input thereof, a time-variant reference signal. The modulator is further configured to provide, at an output thereof, a sequence of target levels to provide switching signals for switching between discrete output levels of the multilevel converter according to the shape of the reference signal. The modulator is further configured to determine a critical level as an intermediate output level of the multilevel converter which is closest to the level of the reference signal, and to output only target levels corresponding to output levels different from the critical level.

According to another aspect, a flying-capacitor type multilevel converter, FC-MLC, is provided. The multilevel converter includes multiple switching cells each comprising a flying capacitor and at least two semiconductor switches. The multilevel converter according to the aspect comprises a modulator as described herein.

According to yet another aspect, a method of operating a flying-capacitor type multilevel converter, FC-MLC, according to a time-variant reference signal is provided. In the method, a sequence of target levels is output to provide switching signals for switching between discrete output levels of the multilevel converter according to the shape of the reference signal. The method comprises determining a critical level as an intermediate output level of the multilevel converter which is closest to the level of the reference signal, and outputting only target levels corresponding to output levels different from the critical level.

Other features will be recognized from consideration of the Detailed Description and Claims, which follow.

BRIEF DESCRIPTION OF THE SEVERAL VIEWS OF THE DRAWING(S)

Various aspects and features of the disclosed technology will become apparent upon review of the following detailed description and upon reference to the drawings.

DETAILED DESCRIPTION OF THE INVENTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed technology provides an approach to allow for a modulator for a flying-capacitor type multilevel converter having reduced switching loss. As discussed below in more detail, the modulator avoids hard switching of the switches in the switching cells and helps in achieving soft-switching conditions.

Figure 1A:
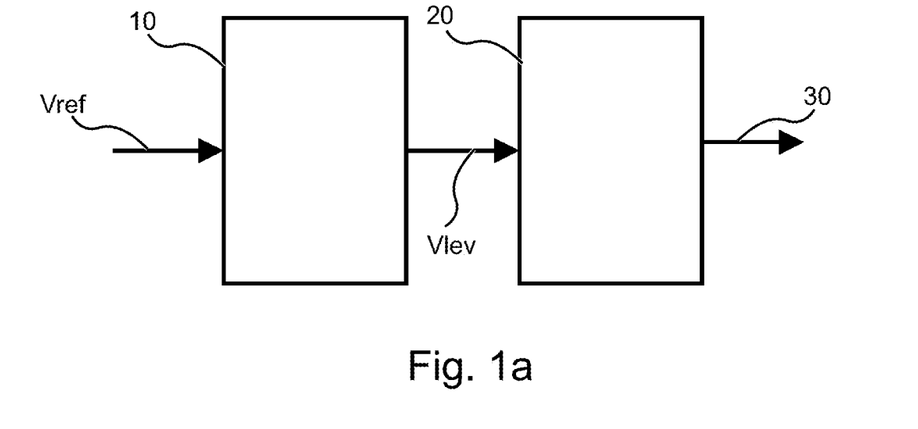
FIG. 1a shows a schematic block diagram of a modulator and a redundant state selector, in accordance with the disclosure.

FIG. 1a shows a schematic block diagram of a modulator 10 that receives a time-variant reference signal Vref and provides a sequence of target levels Vlev, or target level signal, to a redundant state selector 20 discussed below in more detail. The state selector 20 provides switching signals 30 for switching between discrete output levels of a multilevel converter 100, which is discussed below in more detail, according to the shape of the reference signal Vref. The modulator determines a critical level as an intermediate output level of the multilevel converter which is closest to the level of the reference signal, and outputs only target levels Vlev corresponding to those output levels that are different from the critical level.

It is noted that the switching control of the FC-MLC is typically performed in a time-discrete manner at a suitable control cycle, or control interval, and involves a sampling of the time-variant reference signal at sampling intervals. Typically, but without limitation, the control cycle equals the sampling interval. It is understood that the critical level may change from one control cycle to the next control cycle and/or from one sampling interval to the next sampling interval. The sequence of target levels is typically representative of a limited period of time, e.g. two or more control cycles, but each element of the sequence may be generated for the present control cycle.

The shape of the reference signal, as used herein, typically refers to the variation in time of the reference signal. The shape may include the waveform of the reference signal and the amplitude, (momentary) frequency and phase thereof.

An intermediate output level of the multilevel converter, as used herein, includes some or all output levels of the multilevel converter excluding the uppermost and the lowermost level, i.e. excluding the margin levels for which, either for a higher amplitude or a lower amplitude, no neighbor level exists. For example, in a non-limiting example of a five-level FC-MLC, +VDC/4, 0, and −VDC/4 are intermediate output levels since each of them has neighbor levels in both directions of the amplitude. Whereas +VDC/2 and −VDC/2 are not intermediate output levels since +VDC/2 is missing a neighbor level in the positive amplitude direction, and −VDC/2 is missing a neighbor level in the negative amplitude direction.

The critical level, i.e., the intermediate output level of the multilevel converter which is closest to the level of the reference signal, is, e.g., the level that is determined according to the following scheme: For each intermediate output level, determine the absolute value of the difference between the level of the reference signal and the actual intermediate output level, and select the least number as the critical level. In those cases in which the determination reveals two different intermediate output levels (ambiguity), i.e., when the reference signal crosses a boundary, a suitable fallback operation may be performed. For example, as such a fallback operation, the last critical level before the ambiguity may be maintained until the ambiguity is resolved. As the fallback operation, it is also conceivable to anticipate the following critical level, e.g., from the slope of the reference signal, and select the anticipated critical level during the fallback operation. As discussed above, the time-variant reference signal may change with the respective sampling interval and/or control cycle. Thus, the determination of the critical level and the outputting of the suitable target levels avoiding the critical level are typically repeatedly performed, e.g. at the same intervals as the sampling interval or the control cycle.

Figure 1B:
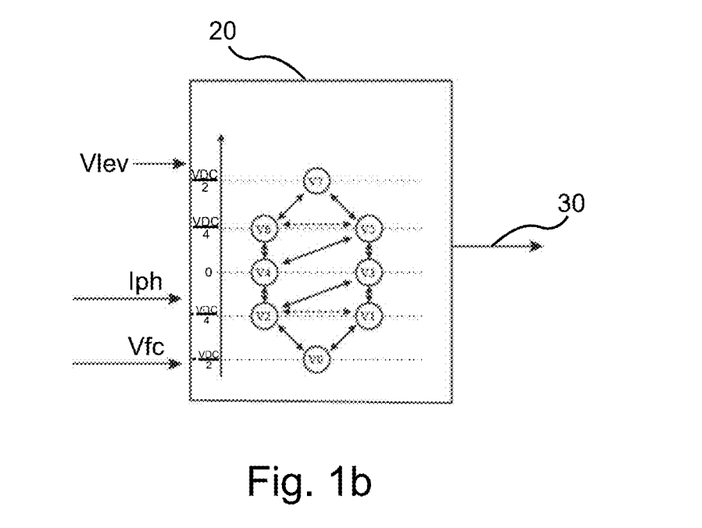
FIG. 1b schematically shows details of a redundant state selector in accordance with the disclosure.

FIG. 1b schematically shows details of the redundant state selector 20. In addition to the target level signal Vlev, the state selector 20 receives a feedback current Iph and a feedback voltage Vfc from the output of the multilevel converter. Among the possible voltage levels in FIG. 1b, i.e., [VDC/2, VDC/4, 0, −VDC/4, −VDC/2], the state selector 20 arbitrates between the redundant states V1, V2; V3, V4; V5, V6 to, e.g., generate a common mode voltage, to balance between the flying capacitor voltages, or to evenly distribute the switching actions among the semiconductor switches in the switching cells, that are discussed below. It is noted that the feedback configuration is only an example of the present embodiment, and feedback-less configurations are possible, e.g., by cycling across the redundant states by a fixed scheme or the like.

Figure 2:
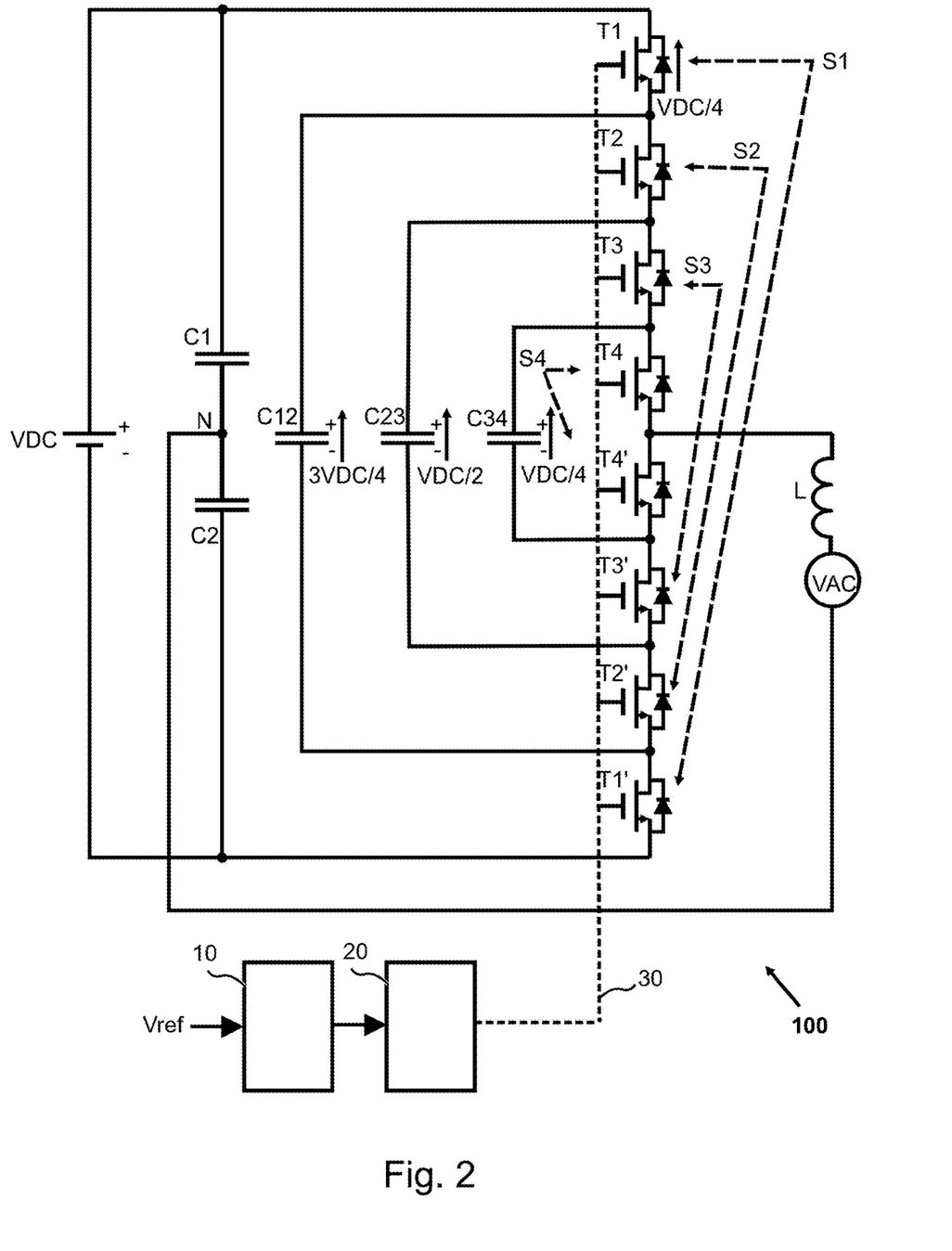
FIG. 2 is a schematic of a configuration for a multilevel converter including a modulator and a state selector in accordance with the disclosure.

FIG. 2 illustrates in a schematic view a configuration of a multilevel converter 100 including the modulator 10 and the state selector 20. The multilevel converter 100 of FIG. 2 is exemplarily shown as a five-level converter having three flying capacitors. However, there is no limitation to a five-level converter, and multilevel converters having more than five levels may be employed, such as 7 or 9 or 11 or more levels, as well as multilevel converters in a different topology, such as a hybrid multilevel converter, e.g. active neutral point clamped flying capacitor converter (ANPC-FC).

In the example of FIG. 2, the multilevel converter has an input voltage source VDC that is divided, via voltage divider capacitors C1, C2 relative to a neutral point N, or via floating capacitors C12, C23, C34, respectively, such that each switching cell S1, S2, S3, S4 is responsible for switching a certain voltage level. Switching cell S1 includes switching semiconductors T1 (seeing a potential of VDC/4) and T1'. Likewise, switching cell S2 includes switching semiconductors T2 and T2', resulting in a potential of 3 VDC/4 across floating capacitor C12. Switching cell S3 includes switching semiconductors T3 and T3', resulting in a potential of VDC/2 across floating capacitor C23. Switching cell S4 includes switching semiconductors T4 and T4', resulting in a potential of VDC/4 across floating capacitor C34.

When performing the conversion operation, or switching operation, the modulator 10 and the state selector 20 control the multilevel converter 100, via gate signals or switching signals 30, such that the desired shape, as defined by the reference signal Vref, is approximately output at the output inductor L as the output voltage VAC.

Conventional modulators do not allow for selecting the switching instants of the switching semiconductors such that favorably low energy losses arise in the semiconductors. Rather, a hard-switching scenario leads to comparatively high energy losses. Considered is the following case in a hard-switching scenario, or hard turn-on, in a switching cell comprising semiconductors T1 and T1' in a half-bridge configuration: Assume that one of the semiconductors in the switching cell, e.g. T1', is conducting the current. Now, T1' is turned off. The current commutates to the body diode D1' of T1'. Afterwards, T1 is hard turned on. Across T1', no voltage can build up since the D1' is still conducting. Therefore, first the current has to commutate from the body diode D1' to T1. Across T1, the full voltage is still applied. At the end of this phase, the reverse recovery effect of the body diode, while it changes into the blocking state, has to be considered. When D1' starts blocking, the parasitic capacitor CT1 of T1 and the parasitic capacitor CT1' of T1' are recharged. The recharging process (discharging of CT1 and charging of CT1') results in an increased current in T1 and thus in additional loss.

Figure 3A:
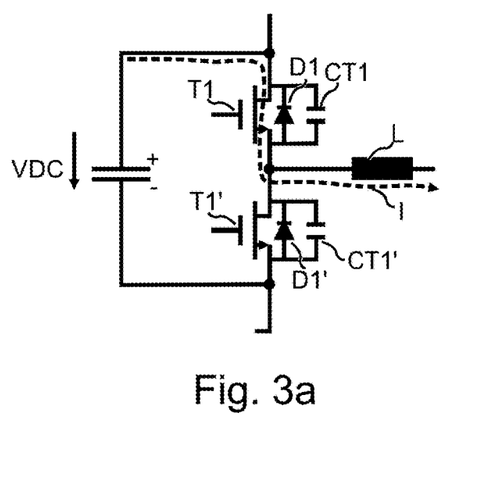
FIGS. 3a, 3b, 3c, and 3d schematically show a zero voltage switching scenario that is achieved by employing the technology as disclosed herein.
Figure 3B:
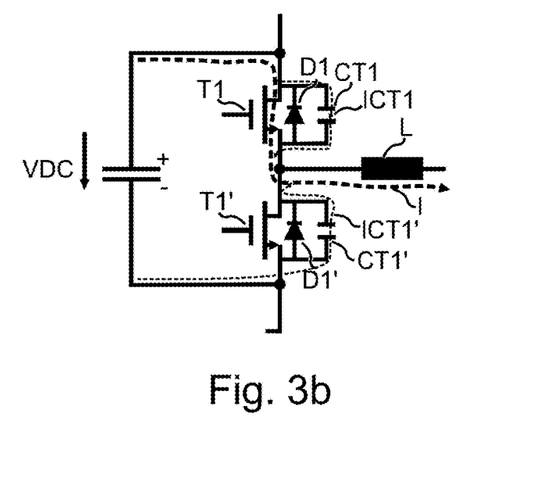
Figure 3C:
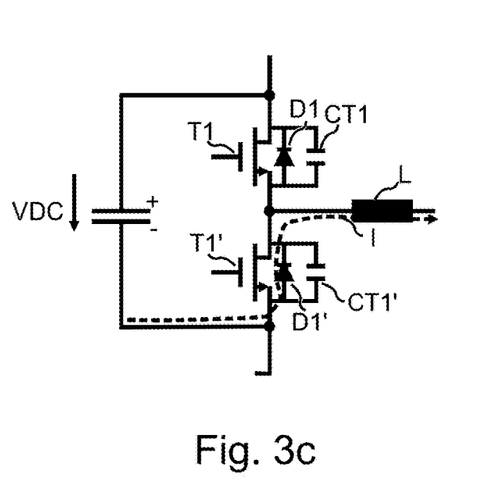
Figure 3D:
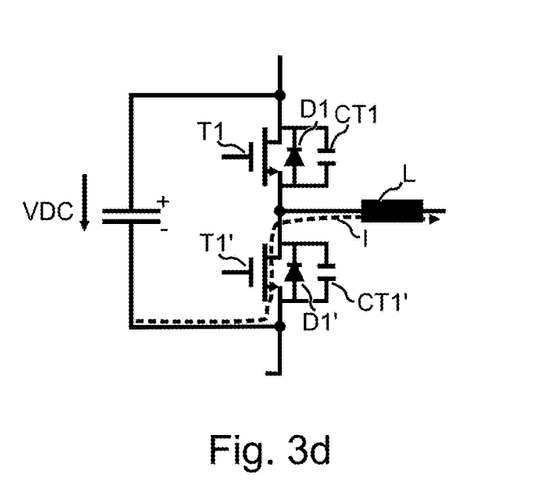

FIGS. 3a, 3b, 3c, and 3d show a favorable zero voltage switching scenario that is achieved by employing the technology as disclosed herein. Considered is the following case in a switching cell comprising semiconductors T1 and T1' in a half-bridge configuration, as shown in FIGS. 3a, 3b, 3c, and 3d. Assume that initially, T1 is conducting the current I (see FIG. 3a). When T1 is turned off in FIG. 3b, a portion ICT1 of the current will get diverted to the parasitic capacitance ICT1 and starts charging it. At the same time, the parasitic capacitance ICT1' is discharged via current ICT1'. In an ideal scenario, the full current is required to recharge the parasitic capacitances such that the current through T1 and accordingly the losses in it are negligible. This strongly depends on the switching speed, the applied voltage and the switched current. In FIG. 3c, the voltage across T1' is reduced to zero and the body diode D1' starts to conduct. Subsequently, in FIG. 3d, T1' is turned on when D1' is conducting the full current, i.e. under zero voltage conditions (soft-switching). The current commutates (nearly) losslessly from D1' to T1'. This soft-switching generates low switching loss energies for both semiconductors T1, T1'.

Figure 4:
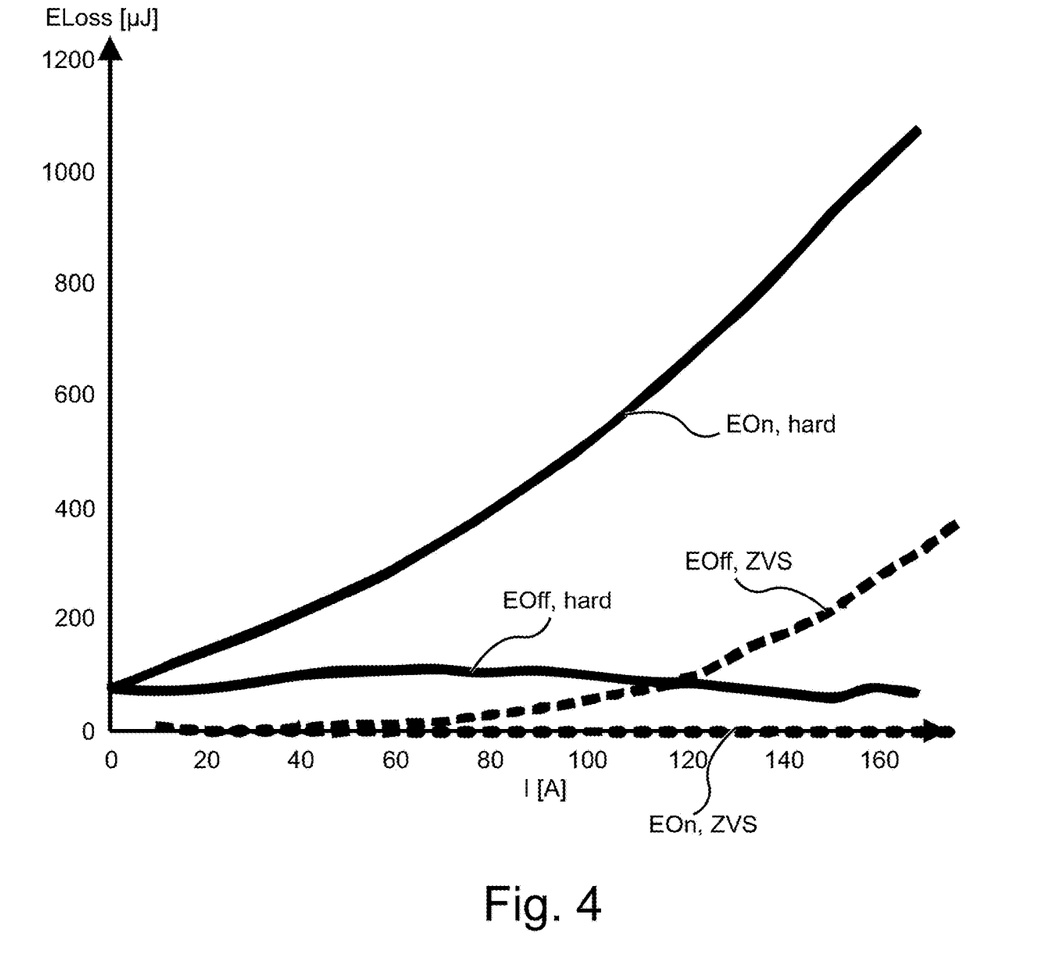
FIG. 4 is a graph illustrating switching losses for two scenarios of hard-switching and soft-switching, for an exemplary MOSFET, in accordance with the disclosure.

FIG. 4 illustrates the switching losses for both scenarios, i.e., hard-switching and soft-switching, for an exemplary MOSFET switched at an exemplary voltage of 100 V. The considered gate voltage is 12 V for turning on and 0 V for turning off with an applied gate resistance of 1.5Ω. A snubber capacitance of 12 nF is used parallel to the MOSFETs. Loss energies for hard-switching turn off (EOff, hard) and for hard-switching turn on (EOn, hard) are considerably higher than loss energies for zero voltage switching turn off (EOff, ZVS) and zero voltage switching turn on (Eon, ZVS).

Generally, soft-switching conditions, i.e. conditions with zero-voltage switching, can be achieved with a modulator providing a modulation approach that leads to a reversal of the sign of the output current in every modulation period, or control cycle (current reversal).

Figure 5A:
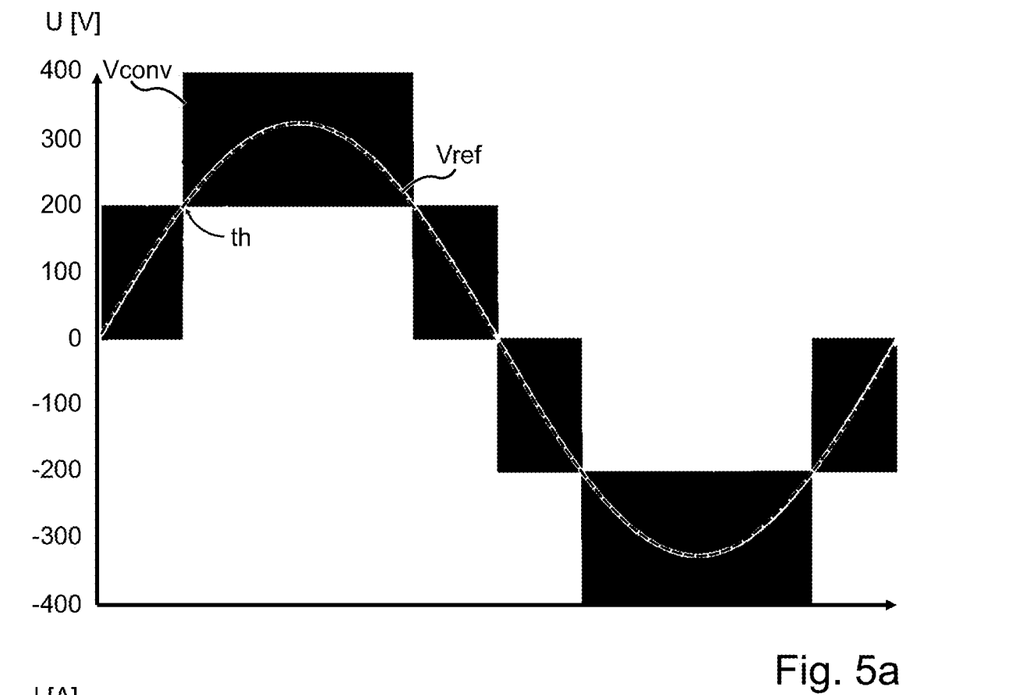
FIGS. 5a and 5b are graphs illustrating a conventional modulation approach, in accordance with the disclosure.
Figure 5B:
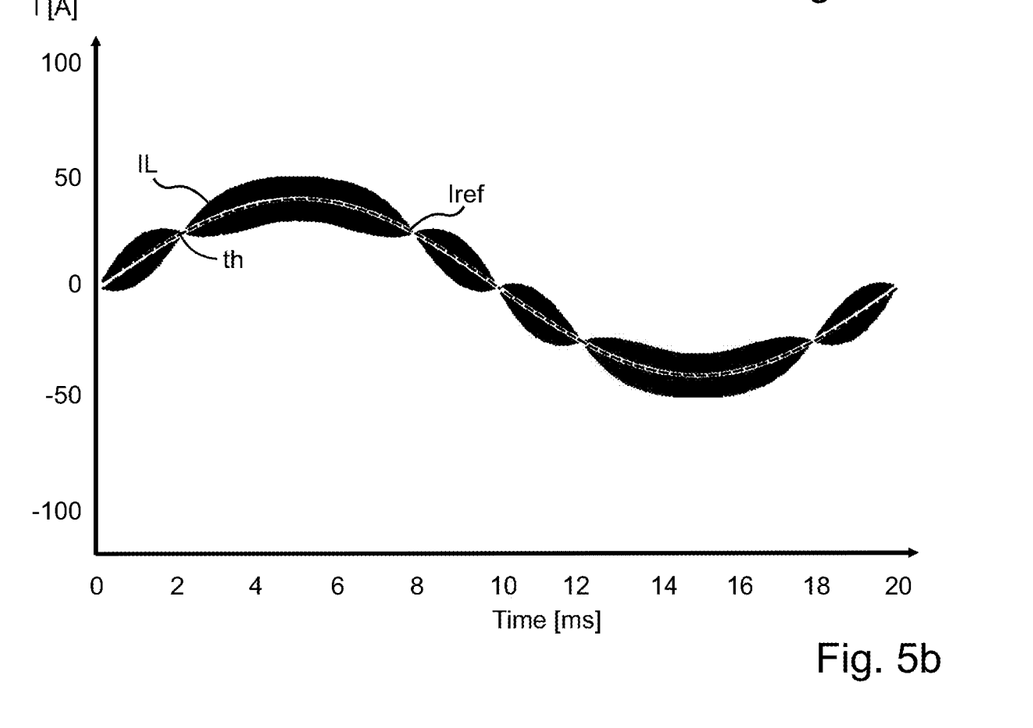

FIGS. 5a and 5b illustrate a conventional modulation approach in which soft-switching conditions cannot be achieved in all switching instants. In FIG. 5a, the multilevel converter 100 is controlled according to a reference voltage signal Vref and outputs, at output inductor L, an output voltage Vconv (see FIG. 5a). Vconv alternates very fast between two neighboring levels, i.e., 0 V and 200 V in the time period from 0 ms to 2 ms, 200 V and 400 V in the time period from 2 ms to 8 ms, and so on. Due to the scale of the graphs shown in FIGS. 5a and 5b, the curve of Vconv thus appears to be a filled rectangle. For convenience, the reference voltage signal Vref is shown on the same scale as the output voltage Vconv. In this example, a five-level converter having output levels of +VDC/2=400 V, +VDC/4=200 V, 0 V, -VDC/4=-200 V, -VDC/2=-400 V is used. The ideal curve of the associated output current is denoted Iref (see FIG. 5b). The curve of the actual output current is denoted IL. As Vconv, due to the scale of the graphs shown, IL alternates very quickly between the lower and upper boundaries, resulting in a current ripple, such that the curve of IL appears to consist of black areas.

When the reference voltage Vref in FIG. 5a crosses the output levels, such as at the time th=2 ms, the voltage ripple across the output inductor L is small. As a result, the current ripple at this point in time is small as well. In this case of a small current ripple at this point in time, no current reversal can occur within a modulation period, or control cycle. Therefore, no soft-switching conditions can be achieved. Also, during a time period around time point th, the current ripple is slightly increased with respect to time point th; yet it is still so small that soft-switching conditions cannot be achieved.

Figure 6A:
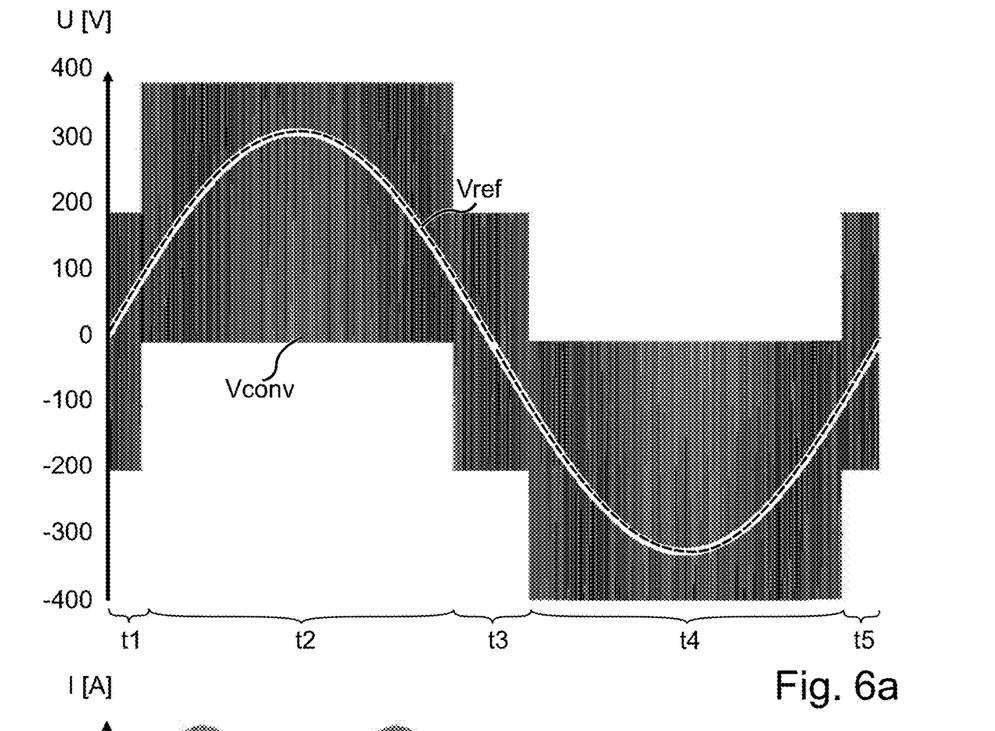
FIGS. 6a and 6b are graphs illustrating a modulation approach in accordance with the disclosure.
Figure 6B:
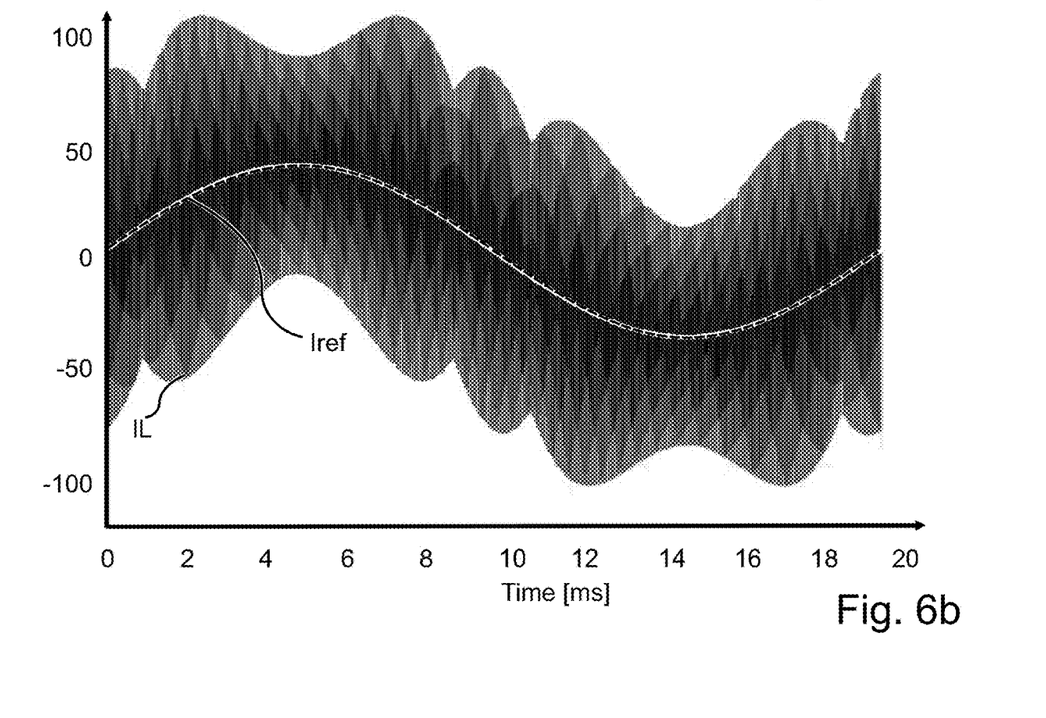

FIGS. 6a and 6b are graphs illustrating the modulation approach according to the present disclosure. As in FIGS. 5a and 5b, also in FIGS. 6a and 6b, the multilevel converter 100 is controlled according to a reference voltage signal Vref and outputs, at output inductor L, an output voltage Vconv (see FIG. 6a). For convenience, the reference voltage signal Vref is shown on the same scale as the output voltage Vconv. In this example, a five-level converter having output levels of +VDC/2=400 V, +VDC/4=200 V, 0 V, -VDC/4=-200 V, -VDC/2=-400 V is used. The ideal curve of the associated output current is denoted Iref (see FIG. 6b). The curve of the actual output current is denoted IL. It is noted that these numerical values are only given by way of example, and that other voltage levels may be employed in an actual use case.

The modulation approach according to FIGS. 6a and 6b makes sure that the current reverses its direction in every modulation cycle, or control cycle. In other words: The modulation approach according to FIGS. 6a and 6b makes sure that zero voltage switching conditions are achieved in all switching instants. In order to make the current ripple sufficiently high, the aim of this modulation scheme is to always apply a high enough voltage to the output inductor. In this way, the current flow direction changes. According to the approach disclosed herein, this is achieved by avoiding the typical regions where the reference signal is close to the intermediate output voltage levels. In the exemplary five-level topology of FIGS. 6a and 6b, these voltage levels are +VDC/4=200 V, 0 V, -VDC/4=-200 V. It is noted that there is no limitation on the five-level topology that is contemplated in this exemplary embodiment, and the concept described herein can also be applied to any other multilevel flying capacitor topology.

In the example of FIG. 6a, in a time period t1, the voltage reference signal Vref is closest to the intermediate output voltage level of 0 V. The other output voltage levels are further away from Vref. Thus, the output voltage is synthesized with the next lower output voltage level (-VDC/4) and the next higher output voltage level (+VDC/4).

Likewise, in a time period t2, the voltage reference signal Vref is closest to the intermediate output level of +VDC/4. Thus, the output voltage is synthesized with the next lower output voltage level (0 V) and the next higher output voltage level (+VDC/2). Note that +VDC/2 is an uppermost output level (i.e., it has no upper neighbor level) and thus not considered as an intermediate output level.

In a time period t3, again, the voltage reference signal Vref is closest to the intermediate output voltage level of 0 V. Thus, the output voltage is synthesized with the next lower output voltage level (-VDC/4) and the next higher output voltage level (+VDC/4).

In a time period t4, the voltage reference signal Vref is closest to the intermediate output level of -VDC/4. Thus, the output voltage is synthesized with the next lower output voltage level (−VDC/2) and the next higher output voltage level (0 V). Note that −VDC/2 is a lowermost output level (i.e., it has no lower neighbor level) and thus not considered as an intermediate output level.

In a time period t5, again, the voltage reference signal Vref is closest to the intermediate output voltage level of 0 V. Thus, the output voltage is synthesized with the next lower output voltage level (−VDC/4) and the next higher output voltage level (+VDC/4).

The skipping of the critical level has the effect that always enough voltage can be applied across the output inductor L, such that it is ensured that the current direction can always be changed and soft-switching is performed. In other words: In every modulation period, or control cycle, the current changes its flow direction. The modulator 10 can thus be referred to as a level-skipping modulator.

Conventionally, film capacitors are used for the flying capacitors of the multilevel converter. According to the technology as disclosed herein, only capacitive turn-off (i.e., zero voltage switching, ZVS) of the semiconductor switches is required, and no hard-switching occurs. This allows for the switching frequency to be increased by a factor of approximately more than 5, for example a factor of approximately 10, compared to the switching frequency of a conventional multilevel converter. Besides a reduction of LCL input filter volume, weight, and cost, a raised switching frequency allows for a reduction of the volume, weight and cost of the flying capacitors. In embodiments, the flying capacitor of at least one of the switching cells is a ceramic capacitor.

In embodiments, the semiconductor switches of at least one of the switching cells are selected from the group consisting of a Si-based MOSFET, a SiC-based MOSFET, and a GaN-based MOSFET. For these kinds of MOSFETs, avoiding hard-switching operation by the technology as disclosed herein may help to reduce the switching loss considerably.

In embodiments, the semiconductor switches of at least one of the switching cells are super-junction MOSFETs. Non-limiting examples of a super-junction MOSFET include CoolMos made by Infineon, and HiPerFet made by IXYS. These kinds of MOSFETs can be reliably used with the present technology, where any hard-switching operation according to the conventional technology would lead to their destruction.

Figure 7A:
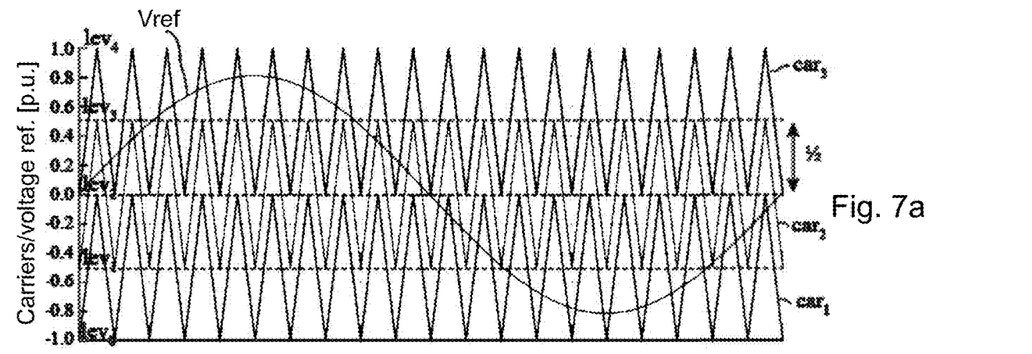
FIGS. 7a, 7b, and 7c are time diagrams for a further, general explanation of the modulation method in accordance with the disclosure.
Figure 7B:
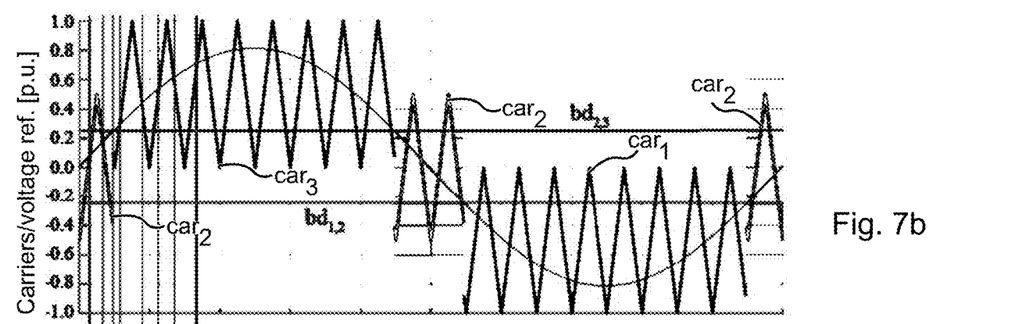
Figure 7C:
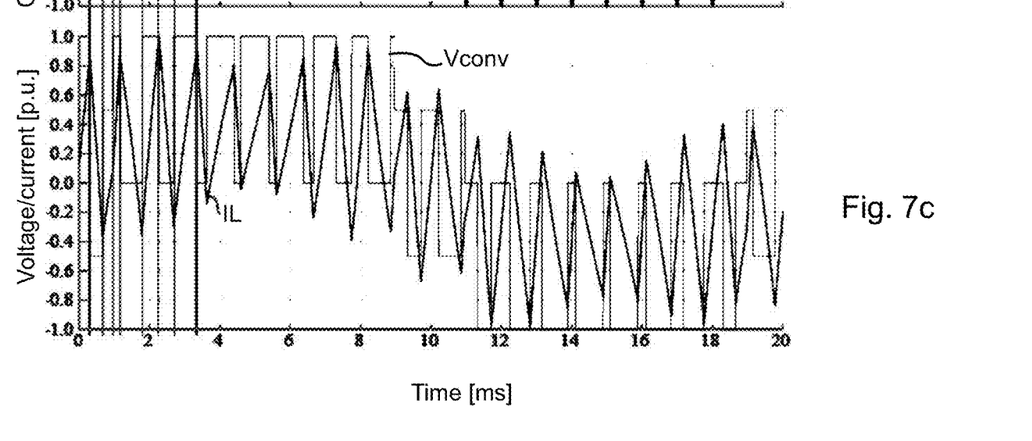

FIG. 7 shows time diagrams for a further, general explanation of the modulation method. A flying-capacitor type multilevel converter has N voltage levels ($lev_i$, $i \in [0, N-1]$). N−2 triangular carriers $car_i$, $i \in [1, N-2]$ are generated which are in phase, have a magnitude of 2/(N−1), and are disposed, in the voltage plot, above each other and voltage shifted (i.e., DC biased) by 2/(N−1). A carrier $car_i$ is thus centered on the voltage level $lev_i = 2i/(N-1)-1$ and reaches $lev_i \mp 2/(N-1)$. These carriers are overlapping, i.e., between two voltage levels $lev_i$ and $lev_{i+1}$ always two carriers are available ($car_i$ and $car_{i+1}$) for $i \in [1,(N-3)]$. To determine which of each carrier is active, a boundary condition $bd_{j,j+1}$ $j \in [1,N-3]$ between the carriers is introduced. These boundaries lay exactly in the middle of two voltage levels $bd_{j,j+1} = lev_j + 1/(N-1)$. Which carrier is active can be expressed as follows:

$$\text{ref} < bd_{1,2} \rightarrow car_1$$

$$bd_{j-1,j} < \text{ref} < bd_{j,j+1} \rightarrow car_j, j \in [2, N-3]$$

$$bd_{N-3,N-2} < \text{ref} \rightarrow car_{N-2}$$

The reference signal is compared to the active carrier signal. Thus, the switching time instants can be determined. If the voltage reference signal is above the active carrier $car_i$, the voltage level $lev_{i+1}$ is activated. If the reference signal is below the active carrier $car_i$, the voltage level $lev_{i+1}$ is activated.

The redundant state selector 20 selects one of the redundant switching states according to the activated voltage level. For example, the redundant state selector 20 iterates through the different redundant states of the multi-level converter and evenly distributes the switching losses across the individual switches. This leads to a balancing effect of the flying capacitor voltages. All redundant switching states for a given voltage level are enumerated, and with every activation of the corresponding voltage level, the next redundant switching state is selected. Repeating this sequence in a cyclic manner ensures that all redundant states are activated evenly. During each switching action, two switches are switched since one voltage level (the critical level) is skipped. Due to the redundancy of the intermediate output levels each switch is only switched with a frequency of $2f_{car}/(N-1)$, where $f_{car}$ is the carrier frequency. Thus, the effective output switching frequency seen on the voltage of the output inductor L is $f_{car}$.

The modulator, modulating schemes, multilevel converters and methods are thought to be applicable to a variety of multilevel systems. Other aspects and features will be apparent to those skilled in the art from consideration of the specification. It is intended that the specification and drawings be considered as examples only, with a true scope of the invention being indicated by the claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A modulator for a flying-capacitor type multilevel converter, the flying-capacitor type multilevel converter comprising one or more switching cells, the modulator comprising:
an input associated with the one or more switching cells, wherein the input is configured to receive a time-variant reference signal (Vref);
an output associated with the one or more switching cells, wherein a sequence of target levels (Vlev) is provided at the output; and
wherein the modulator is adapted to provide switching signals to the flying-capacitor type multilevel converter associated with the modulator, the flying-capacitor type multilevel converter operating to switch between discrete output levels according to a shape of the time-variant reference signal (Vref); and
wherein the modulator is further configured to:
a) determine a critical level as an intermediate output level of the flying-capacitor type multilevel converter that is closest to a level of the reference signal (Vref); and
b) output only target levels (Vlev) corresponding to output levels that are different from the critical level.

2. The modulator according to claim 1, wherein the modulator is configured to output a sequence consisting of:
the target level (Vlev) corresponding to an output level that is a lower neighbor level of the critical level; and
the target level (Vlev) corresponding to an output level that is an upper neighbor level of the critical level.

3. A flying-capacitor type multilevel converter, comprising:
one or more switching cells;
a modulator having an input and an output, wherein the input is configured to receive a time-variant reference signal, and wherein a sequence of target levels (Vlev) is provided at the output;
wherein the modulator is adapted to provide switching signals to the one or more switching cells, which switch between discrete output levels according to a shape of the time-variant reference signal (Vref); and
wherein the modulator is further configured to:
a) determine a critical level as an intermediate output level of the flying-capacitor type multilevel converter that is closest to a level of the reference signal (Vref); and
b) output only target levels (Vlev) corresponding to output levels that are different from the critical level.

4. The flying-capacitor type multilevel converter according to claim 3, wherein the modulator is configured to output a sequence consisting of:
the target level (Vlev) corresponding to an output level that is a lower neighbor level of the critical level; and
the target level (Vlev) corresponding to an output level that is an upper neighbor level of the critical level.

5. The flying-capacitor type multilevel converter according to claim 3, wherein each of the one or more switching cells comprises a flying capacitor and at least two semiconductor switches.

6. The flying-capacitor type multilevel converter according to claim 3, further comprising a cyclic redundant state selector receiving the sequence of target levels (Vlev) and configured to balance among redundant states of the at least two semiconductor switches that provide a same output level.

7. The flying-capacitor type multilevel converter according to claim 3, wherein the flying capacitor of at least one of the one or more switching cells is a ceramic capacitor.

8. The flying-capacitor type multilevel converter according to claim 3, wherein the semiconductor switches of at least one of one or more switching cells are selected from the group consisting of a Si-based MOSFET, a SiC-based MOSFET and a GaN-based MOSFET.

9. The flying-capacitor type multilevel converter according claim 3, wherein the semiconductor switches of at least one of the switching cells are super-junction MOSFETs.

10. A method of operating a flying-capacitor type multilevel converter according to a time-variant reference signal (Vref) by outputting a sequence of target levels (Vlev), to provide switching signals for switching between discrete output levels of the multilevel converter according to a shape of the reference signal (Vref), the method comprising:
a) determining a critical level as an intermediate output level of the multilevel converter which is closest to the level of the reference signal; and
b) outputting only target levels (Vlev) corresponding to output levels different from the critical level.

11. The method of claim 10, wherein the sequence of target levels (Vlev) is provided to a cyclic redundant state selector, and wherein the state selector balances among redundant states of semiconductor switches of the multilevel converter that provide the same output level.

* * * * *